United States Patent [19]

Kulp et al.

[11] 4,294,864

[45] Oct. 13, 1981

[54] PREPARATION OF HIGH-RATIO CAKES USING UNTREATED WHEAT FLOUR

[75] Inventors: Karel Kulp; William J. Hoover, both of Manhattan, Kans.

[73] Assignee: The American Institute of Baking, Manhattan, Kans.

[21] Appl. No.: 45,347

[22] Filed: Jun. 4, 1979

[51] Int. Cl.$^3$ .............................................. A21D 10/04
[52] U.S. Cl. .................................... 426/549; 426/552; 426/553
[58] Field of Search ................ 426/549, 552, 622, 553

[56] References Cited

U.S. PATENT DOCUMENTS

| | | | |
|---|---|---|---|
| 3,733,209 | 5/1973 | Gupta et al. | 426/552 |
| 3,899,601 | 8/1975 | Johannes | 426/554 |
| 4,157,406 | 6/1979 | Hanamoto et al. | 426/661 |

OTHER PUBLICATIONS

Johnson et al. *Chlorine Treatment of Cake Flour*, II. Effect of Certain Ingredients in Cake Formula, pp. 1-6.
Bennion, The Technology of Cake Making, Leonard Hill Books, 1973, p. 231.
Tighe, Woman's Day Encyclopedia of Cookery, vol. 2, Fawcett Pub. Inc., N.Y. 1966, p. 267.
Pyler, Baking Science & Technology, vol. 11, Siebel Pub. Co., Chicago, Ill., 1974, pp. 905-907.
Tighe, Woman's Day Encyclopedia of Cookery, vol. 5, Fawcett Pub. Inc., N.Y., 1966, pp. 706-707.

*Primary Examiner*—Joseph M. Golian
*Assistant Examiner*—Elizabeth A. Hatcher
*Attorney, Agent, or Firm*—Schmidt, Johnson, Hovey & Williams

[57] ABSTRACT

Improved batter formulations for making high-ratio cakes, along with corresponding methods, are provided which allow complete elimination of treated (e.g., chlorinated) wheat flour in the formulations without sacrifice of desirable organoleptic and structural properties in the end products. The batters include untreated wheat flour (either soft or hard) and respective minor amounts of one or more selected proteins and unmodified starch (e.g., wheat, corn or potato). In certain instances significant reductions in the amounts of shortening and/or egg ingredients normally used can be made, without deleteriously affecting cake quality.

12 Claims, No Drawings

PREPARATION OF HIGH-RATIO CAKES USING UNTREATED WHEAT FLOUR

BACKGROUND OF THE INVENTION

1. Field of the Invention

The present invention is concerned with so-called high-ratio cake batters, and corresponding methods of formulating the same, using untreated soft or hard wheat flours in place of at least a portion of conventionally used chlorinated soft wheat flours which must normally be employed to give desirable end products. More particularly, the invention is concerned with high-ratio formulations which employ substantially untreated wheat flour, along with respective amounts of one or more selected proteins and substantially unmodified starch in order to give high-ratio cake products which are substantially the equal, in terms of organoleptic properties, of prior otherwise identical cakes made using conventional treated wheat flour.

2. Description of the Prior Art

A large proportion of commercially manufactured cakes are of the so-called high-ratio variety. This term is taken to mean a cake which has relatively high levels of sugar (and sometimes water) as compared with the quantity of flour used.

Virtually all high-ratio cakes are made with wheat flour which has been specially treated for use in high-ratio formulations. Specifically, the flour can be treated either by chlorination or heat treatment thereof, although for reasons of cost and performance chlorinated flour is by far the most prevalent product used. Treated flours allow production of high-ratio cakes having desirable organoleptic and structural properties such as crumb quality, shelf life and structural integrity. On the other hand, attempts at directly using untreated flours in high-ratio batter formulations have generally proven to be failures, inasmuch as the resultant cakes tend to collapse and are deficient in other respects.

While chlorinated flour does produce very acceptable high-ratio cakes, a problem is presented because of the possible chemical changes in flour by the action of chlorine. Specifically, many countries of the world have banned the use of chlorinated flours for reasons of public health, and this trend is likely to continue. Accordingly, there is a real need in the art for an acceptable high-ratio batter formulation which can be employed to give satisfactory end products and which partially or desirably completely eliminate the use of chlorinated wheat flour.

Another factor of considerable importance to commercial bakers stems from the fact that high-ratio cakes must generally be prepared using soft or cake flour, as opposed to hard or bread flour. Hence, a commercial bakery must maintain separate storage facilities for soft wheat flour (which is normally chlorinated) for use in cakes and the like, and for hard wheat flour which is used in bread products. As can be appreciated, a considerable savings could be realized if bakeries could have but a single supply of flour for use in all of the products it produces.

Prior work done at Kansas State University in connection with untreated wheat flour cakes is reported in a paper entitled "Chlorine Treatment of Cake Flour II. Effect of Certain Ingredients in the Cake Formula," *Cereal Chemistry Abstracts*, Vol. 24, No. 3, p. 108. In this paper the authors compared small, lean-formula cakes (as opposed to high-ratio cakes) using both chlorinated and untreated flours with various additives. In one series of tests (Table 4), untreated wheat flour was used in the lean formula, along with wheat starch and whole eggs. The results of this test demonstrated that an inferior quality cake was produced as compared with a companion test using exclusively chlorine treated flours. Apart from the fact that this paper describes lean-formula cakes which do not normally contain a protein source apart from the wheat flour, the authors state that when whole eggs are employed in the formula (which of course are a protein source), a deleterious effect on the baking properties of untreated flour is observed.

SUMMARY OF THE INVENTION

The present invention overcomes the problems discussed above by provision of high-ratio batters, and corresponding methods, which employ substantially untreated wheat flour (either hard or soft) without sacrifice of desirable organoleptic and other properties in the resultant cakes. Broadly, the batter compositions of the invention include untreated wheat flour, a quantity of sweetening agent such as sugar which is relatively large in proportion to the quantity of wheat flour for making the batter high-ratio in character, and respective amounts of one or more selected proteins, and substantially unmodified (granular) starch. The batters may also normally contain other ingredients conventionally used in context, e.g., egg whites, whole eggs, nonfat dry milk solids (NFDM), shortening, salt, baking powder, water and cream of tartar.

In use, batter formulations made in accordance with the invention can be used for the production of a wide variety of high-ratio cakes, and the end products are essentially equivalent in terms of organoleptic properties and shelf life to those made using chlorinated cake flour.

It is also significant that substantially untreated flour of the hard or soft variety can be used to good effect in the invention. Thus, a baker need only maintain a supply of untreated hard flour which can be used in high-ratio cakes as well as in breads and the like.

DESCRIPTION OF THE PREFERRED EMBODIMENTS

High-ratio batter compositions in accordance with the invention contain quantities of substantially untreated wheat flour. As used in the present specification and claims, the term "untreated" refers to lack of significant treatment conventionally used to render soft wheat flour acceptable for high-ratio batter compositions. That is to say, it is conventional to provide chlorinated or in some instances heat treated flour for employment in high-ratio batter compositions; the term "untreated" in accordance with the invention simply means that the conventional treatment for such flours has been omitted.

The batter compositions also contain a quantity of sweetening agents (normally sugar) which is relatively large in proportion to the quantity of wheat flour for making the resultant batter high-ratio in character. As those skilled in the art will understand, the sugar is normally present at a level of at least about 110% by weight, based upon so-called "baker's weight", i.e., upon the quantity of flour taken as 100%. Although the upper limit on sugar addition in high-ratio batters varies in specific cases, the sugar is normally present in such batters at a level of from about 110 to 150% by weight (baker's weight).

The batters of the invention also include respective minor amounts of one or more selected proteins and substantially unmodified (granular) starch. The protein is desirably present at a level of from about 4 to 35% by weight (baker's weight), and this range refers to the total quantity of protein sources within the ambit of the invention which are present in the formulation. It will of course be recognized that the protein content in specific cases may vary, depending principally upon the type of cake desired. That is to say, many cake formulas normally include egg whites, which is one of the protein sources of the invention; and this normally used quantity plus that added for purposes of the instant invention is embraced within the above ranges. In terms of protein added strictly for purposes of the present invention, the additional protein (i.e., over that normally used in a given formulation) should be included at a level of from about 0.5 to 6% (baker's weight). The protein should also be selected from the group consisting of the proteins found in rye, soy, cottonseed, peanut, pea, egg whites, milk, whey, wheat protein concentrate and mixtures thereof. Specific sources for such protein are preferably selected from the group consisting of defatted toasted soy flour, active defatted soy flour, soy isolates, cottonseed flour, pea flour, egg whites, nonfat dry milk, whey, wheat protein concentrate, rye flour (preferably light) and mixtures thereof. The most preferred sources are the soy-containing sources.

The starch fraction is preferably selected from the group consisting of unmodified wheat, corn and potato starches and mixtures thereof. In this connection, unmodified or granular starch refers to the starch as extracted from the native source, as compared with so-called "modified" or chemically or biologically treated starches. It was found that high amylose and waxy starches tested did not perform satisfactorily in the invention. For example, waxy corn starch, high amylose starch and pregelatinized starch were tested, but these failed to perform. However, quantities of pregelatinized starch can be included in the high-ratio formulations of the invention, provided that unmodified starch is present as well.

The unmodified starch should be present in the batter formulation at a level of from about 5 to 15% by weight (baker's weight), and more preferably from about 10 to 15% (baker's weight).

In the preparation of high-ratio formulations in accordance with the invention, the ingredients are mixed in a manner similar to the conventional technique. However, it has been found that the addition of salts (usually table salt and baking powder) should be delayed until near the end of the batter-making procedure. This has been shown to give enhanced results. Although the reason for the effect is not completely understood, it is believed that early salt addition inhibits protein whipping properties (especially those of soy) and therefore less air incorporation is attained as evidenced by higher specific gravities of the batters.

Formulas for white or yellow layer cake batter preferably include the addition of cream of tartar to bring the pH of the batters within a suitable range. The pH values of such cake batter should be in the range of about 6.9–7.1, and these values are particularly desirable when the addition of salt and baking powder is delayed as described above. When a procedure is employed with early addition of salt and baking powder, the proper pH should be somewhat higher, generally in the range of from about 7.4–7.5.

The following Examples will illustrate the formulation of high-ratio batters in accordance with the invention, and the production of end products therefrom. The Examples are presented for illustrative purposes, and nothing therein should be construed as a limitation upon the overall scope of the invention. In all cases percentages by weight are in terms of baker's weight.

EXAMPLE 1

A series of high-ratio cakes were produced in accordance with the invention. In all cases a Hobart N-50 mixer with whipping attachment was employed for blending the batter ingredients. The specific procedure used was as follows:

(1) Blend all dry ingredients, except salt and baking powder or other salts, for 1 minute (or until completely blended) at 1st speed;

(2) Add ½ of total batter water and mix for 1 minute at 3rd speed;

(3) Add shortening and mix at 1st speed for 1 minute. During step (3), liquid whole eggs are gradually added;

(4) Scrape bowl and continue mixing at 3rd speed for approximately 30 seconds or until the specific gravity of the batter reaches a value of about 0.90–0.95; and (5) Add baking powder, salt, and the balance of the batter water and the batter is mixed for 2 minutes at 2nd speed, then for 2 minutes at 1st speed. The final temperature of the batter should be kept at 68°–70° F. Baking is conducted in the conventional manner [e.g., 350°–375° F. for 23–26 minutes for 8 inch layers (12 ounce batter)].

In one specific test a high-ratio white layer cake was produced, using the following ingredients:

TABLE I

| | % (baker's weight) |
|---|---|
| Untreated wheat cake flour | 100 |
| Soy flour | 12 |
| Starch | 10 |
| Sugar | 120 |
| Nonfat dry milk solids (NFDM) | 11.75 |
| Egg white liquid | 31.5 |
| Shortening | 50 |
| Salt | 3 |
| Baking powder | 6.25 |
| Water | 137 (variable) |
| Cream of Tartar | 0.5 |

After baking the cake was examined for crumb and grain quality, volume and shelf life, and was found to be essentially equivalent to a standard white cake produced using chlorinated cake flour.

In another test using the identical procedure, a high-ratio yellow cake was prepared which was equivalent to conventional yellow cakes using chlorinated flour. The ingredients were as follows:

TABLE II

| | % (baker's weight)) |
|---|---|
| Untreated wheat cake flour | 100 |
| Soy flour | 12 |
| Starch | 10 |
| Sugar | 120 |
| NFDM | 11.75 |
| Liquid whole eggs | 40 |
| Shortening | 25 |
| Salt | 3 |
| Baking powder | 6.25 |
| Water | 113 (variable) |

TABLE II-continued

| | % (baker's weight) |
|---|---|
| Cream of tartar | 0.5 |

It was discovered in this test that, in some instances, use of the present invention allows or requires a substantial reduction in the quantity of shortening. Specifically, standard yellow cake formulae normally include 50-55% (baker's weight) shortening, but as shown in Table II, 25% (baker's weight) shortening with the instant invention gives equivalent results. Broadly speaking, shortening reductions (over that normally employed) of up to 55% are possible with the invention.

A chocolate cake was also made by the above described method, using the following ingredients:

TABLE III

| | % (baker's weight) |
|---|---|
| Untreated wheat cake flour | 100 |
| Soy flour | 12 |
| Starch | 10 |
| Sugar | 145 |
| Cocoa (Dutched) | 23 |
| NFDM | 15 |
| Shortening | 25 |
| Whole eggs (Liquid) | 45 |
| Salt | 4 |
| Baking powder | 4 |
| Baking soda | 1.5 |
| Water | 135 (variable) |

Here again, the resultant cake was in every way the equal of the usual high-ratio chocolate cake made with chlorinated flour.

EXAMPLE 2

A high-ratio angel food cake was made by the following procedure. First, four preblends were prepared as follows:

TABLE IV

| Preblend # | | % (baker's weight) | |
|---|---|---|---|
| 1. | Egg Whites (Liquid) | 286 | |
| 2. | Sugar | 65 | |
| | Cream of tartar | 4 | Blend by Sifting |
| | Salt | 3 | |
| 3. | Flavor (e.g. vanilla) | As Desired | |
| 4. | Untreated wheat cake flour | 100 | |
| | Soy | 6 | |
| | Starch | 10 | Blend by Sifting |
| | Sugar | 213 | |

Preblend No. 1 was first beaten to a wet peak, whereupon No. 2 was added gradually, with continued beating, to bring the egg whites back to medium peak. Preblend No. 3 was then added with additional beating, followed by folding in No. 4 carefully by hand. Twenty ounces of the mixture was then scaled, placed in a 10" tube, and baked 35 minutes at 375° F.

The resultant cake was equivalent in all respects to the conventional variety.

All of the above examples were repeated using untreated hard wheat bread flour in place of the untreated cake flour. The resultant cakes were essentially equivalent with those of the previous examples. Therefore, the utility of hard wheat flour in the present invention is manifest.

Having thus described the invention, what is claimed as new and desired to be secured by Letters Patent is:

1. A high-ratio cake batter composition, comprising:
   a quantity of wheat flour, said flour being free of treatment, including chlorination and heat treatment, for rendering the flour usable in high-ratio cake batter;
   at least about 110% of a sweetening agent;
   from about 4 to 35% of protein taken from the group consisting of proteins found in rye, soy, cottonseed, peanut, pea, egg whites, milk, whey, wheat protein concentrate and mixtures thereof; and
   from about 5 to 15% of unmodified starch,
   said percentage ranges being stated in terms of flour weight basis wherein the quantity of said wheat flour is taken as 100% by weight.

2. The composition as set forth in claim 1 wherein said portion of said protein is added in an amount of from about 0.5 to 6% on a flour weight basis over and above the amount of protein normally present in said composition.

3. The composition as set forth in claim 1 wherein said protein is derived from a source selected from the group consisting of defatted toasted soy flour, active defatted soy flour, soy isolates, rye flour, cottonseed flour, pea flour, egg whites, nonfat dry milk, whey, wheat protein concentrate and mixtures thereof.

4. The composition as set forth in claim 1 wherein said starch is selected from the group consisting of the starches of wheat, corn, potato and mixtures thereof.

5. The composition as set forth in claim 1 wherein said level is from about 10 to 15%.

6. The composition as set forth in claim 1 including a quantity of shortening.

7. The composition as set forth in claim 1 including a quantity of pregelatinized starch.

8. The composition as set forth in claim 1 wherein said batter composition is free of treated flour.

9. A method of formulating a high-ratio batter composition which comprises the steps of:
   admixing into a batter
   a quantity of wheat flour, said flour being free of treatment, including chlorination and heat treatment, for rendering the flour usable in high-ratio cake batter;
   at least about 110% of a sweetening agent;
   from about 4 to 35% of protein taken from the group consisting of proteins found in rye, soy, cottonseed, peanut, pea, egg whites, milk, whey, wheat protein concentrate and mixtures thereof; and
   from about 5 to 15% of unmodified starch,
   said percentage ranges being stated in terms of flour weight basis wherein the quantity of said wheat flour is taken as 100% by weight.

10. The method as set forth in claim 9 wherein said portion of said protein is added in an amount of from about 0.5 to 6% on a flour weight basis, over and above the amount of protein normally present in said composition.

11. The method as set forth in claim 9 wherein said starch is selected from the group consisting of wheat, corn, potato and mixtures thereof.

12. The method as set forth in claim 9 including the step of incorporating into said composition respective quantities of salt and baking powder, said incorporation step being undertaken near the end of the admixing of the ingredients making up said batter.

* * * * *